(12) United States Patent
Kim

(10) Patent No.: US 6,181,550 B1
(45) Date of Patent: Jan. 30, 2001

(54) APPARATUS FOR MOUNTING SPEAKERS IN A PORTABLE COMPUTER

(75) Inventor: Heon-Gil Kim, Kyunggi-do (KR)

(73) Assignee: Samsung Electronics Co., Ltd., Suwon (KR)

(*) Notice: Under 35 U.S.C. 154(b), the term of this patent shall be extended for 0 days.

(21) Appl. No.: 09/036,691

(22) Filed: Mar. 9, 1998

(30) Foreign Application Priority Data

Mar. 8, 1997 (KR) .................................................... 97/7787

(51) Int. Cl.[7] .............................. H05K 5/00; H05K 7/00
(52) U.S. Cl. ........................ 361/683; 361/681; 361/726; 361/727
(58) Field of Search .................................. 361/683, 686, 361/681, 727, 726; 292/137, 302; 381/309, 87; 312/223.1, 223.2

(56) References Cited

U.S. PATENT DOCUMENTS

| | | |
|---|---|---|
| 5,190,258 | 3/1993 | Yu . |
| 5,519,572 | 5/1996 | Luo . |
| 5,576,930 | 11/1996 | Kuo et al. . |
| 5,583,743 | 12/1996 | Levins et al. . |
| 5,588,063 | 12/1996 | Edgar . |
| 5,623,391 | 4/1997 | Chase et al. . |
| 5,666,263 | 9/1997 | Mundt et al. . |
| 5,668,882 | * 9/1997 | Hickman et al. ...................... 381/24 |
| 5,675,426 | * 10/1997 | Meisner et al. ...................... 358/838 |
| 5,701,347 | 12/1997 | Daniels et al. . |
| 5,838,537 | * 11/1998 | Lundgren et al. ................... 361/683 |
| 6,040,978 | * 3/2000 | Spencer ............................... 361/683 |

\* cited by examiner

Primary Examiner—Leo P. Picard
Assistant Examiner—Tung Minh Bui
(74) Attorney, Agent, or Firm—Robert E. Bushnell, Esq.

(57) ABSTRACT

A device for mounting a speaker on a portable computer is provided that hingably secures a speaker housing to the side of the display unit. The device and speaker housing move between a recessed and folded position and an unfolded and extended position. A channel shaped groove is formed in the side portion of the main body to allow the speaker housing to be folded into a recessed and flush position. The device may also be constructed with a latch that is attached to the speaker housing to secure the display unit to the main body in its folded position. To allow the distance between the speakers to be adjusted the device is constructed with an extendable bar that can slide in and out of the display unit.

This speaker mounting device provides a way to vary the distance between speakers attached to a portable computer, a way to mount speakers so that both the device and the attached speakers can be retracted flush with the portable computer to allow the portable computer and the associated speakers to be easily shipped and stored, a way to eliminate the need for a separate locking mechanism, and a way to enhance the stereophonic qualities of the sound supplied by the speakers.

20 Claims, 13 Drawing Sheets

APPARATUS FOR MOUNTING SPEAKERS IN A PORTABLE COMPUTER

CLAIM OF PRIORITY

This application makes reference to, incorporates the same herein, and claims all rights accruing thereto under 35 U.S.C. §119 through my patent application entitled Structure for Mounting Speakers in a Portable Computer and Speaker Mounting Device Therefor earlier filed in the Korean Industrial Property Office on Mar. 8, 1997 and there duly assigned Ser. No. 1997/7787.

BACKGROUND OF THE INVENTION

1. Field of the Invention

The present invention relates to a device for a computer and, more specifically, to a device for mounting speakers to a portable computer that increases the effect of the sound generated by speakers.

2. Background Art

A recent trend in personal computing has been toward the multimedia computer that provides high quality audio and video output. Such systems have typically included a pair of add-on speakers which are placed near the monitor and plugged into a sound board in the computer. Unfortunately, the use of add-on speakers consumes valuable desktop space and requires separate re-orientation of the monitor and the speakers when a user desires to change position. Furthermore, portable or notebook computers have become a popular alternative to traditional desktop computers, largely due to their superior movability, simplicity, and convenience. Portable computers are often equipped with various peripheral devices that aid in achieving a multimedia effect. These portable computers use speakers to reproduce sound generated by the sound system within the computer. Furthermore, the typical sound system has been improved to support stereophonic or three-dimensional stereophonic, and the speakers are usually incorporated into the main body of the portable computer. The speakers built into the portable computer are generally kept at an interval that facilitates simulating a stereophonic effect.

Some techniques for integrating speakers with a computer system are shown, for example, in U.S. Pat. No. 5,588,063 to Edgar entitled Personal Multimedia Speaker System, U.S. Pat. No. 5,666,263 to Mandate entitled Attaching a Speaker to a Computer Component, U.S. Pat. No. 5,583,743 to Levins entitled Appliance Housing and Speakers Mounted Thereto, U.S. Pat. No. 5,576,930 to Kuo entitled Rack Pair Mounting Speakers and System Board in a Monitor of a Computer System, U.S. Pat. No. 5,519,572 to Luo entitled Computer Peripheral Apparatus, U.S. Pat. No. 5,701,347 to Daniels entitled Audio System for a Personal Computer, U.S. Pat. No. 5,190,258 to Yu entitled Articulated Support Assembly, and U.S. Pat. No. 5,623,391 to Chase entitled Speaker Cover and Snap-In Coupling Therefor. Contemporary speakers used with laptop computers are limited in the distance that the speakers can be separated from each other during operation without using wires to connect the speakers to the monitor.

I believe it may be possible to improve on the contemporary art by providing a device for attaching speakers to a portable computer's monitor, that is extendable to vary the distance between the speakers, that allows both the device and the attached speakers to be retracted flush with the computer to allow the portable computer and the associated speakers to be easily shipped and stored, that may be constructed with rigid components to connect the speakers to the monitor while avoiding the problem of tangled wires and imprecise symmetrical positioning, that doubles as a locking mechanism to secure the display section of the portable computer to the main housing when the portable computer is in a closed position, that does not require the use of wires exclusively to connect the speakers to the monitor, that connects to the monitor to allow for better audio and visual synchronization, and that enhances the stereophonic qualities of the speakers.

SUMMARY OF THE INVENTION

Accordingly, it is an object of the present invention to provide a device for attaching speakers to a portable computer that is extendable to vary the distance between the attached speakers.

It is another object to provide a device for attaching speakers to a portable computer that allows both the device and the speakers to be retracted flush with the portable computer to allow the portable computer to be more easily shipped and stored.

It is still another object to provide a device for attaching speakers to a portable computer that is constructed substantially of rigid members to avoid the problem of tangled wires and to avoid the imprecise symmetrical positioning of speakers.

It is yet another object to provide a device for attaching speakers to a portable computer that does not exclusively use wires to connect the speakers to the monitor.

It is still yet another object to provide a device for attaching speakers to a portable computer that prevents the speakers from requiring separate repositioning when the portable computer is rotated.

It is a further object to provide a device for attaching speakers to a portable computer that allows the speakers to deliver an improved stereophonic sound.

It is a further object still to provide a device for attaching speakers to a portable computer that connects to the monitor to allow for better audio and visual synchronization.

It is yet a further object to provide a device for attaching speakers to a portable computer that doubles as a locking mechanism to secure the display section of the portable computer to the main housing when the portable computer is in a closed position.

To achieve these and other objects, a device for mounting a speaker on a portable computer is provided that hingably secures a speaker housing to the side of the display unit. The device and speaker housing move between a recessed and folded position and an unfolded and extended position. A channel shaped groove is formed in the side portion of the main body to allow the speaker housing to be folded into a recessed and flush position. The device may also be constructed with a latch that is attached to the speaker housing to secure the display unit to the main body in its folded position. To allow the distance between the speakers to be adjusted the device is constructed with an extendable bar that can slide in and out of the display unit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
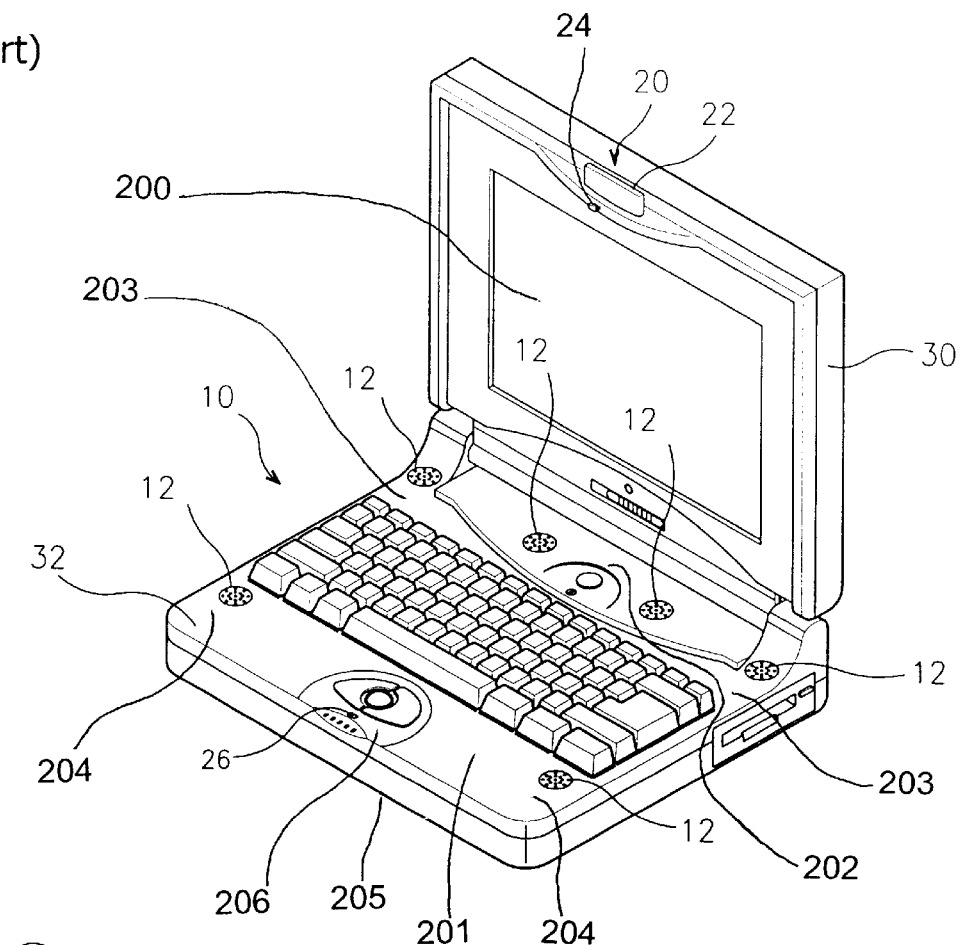
FIG. 1 is a perspective view of a portable computer showing the location of speakers and their arrangement relative to an LCD display locking mechanism used when the LCD monitor is closed.
Figure 2:
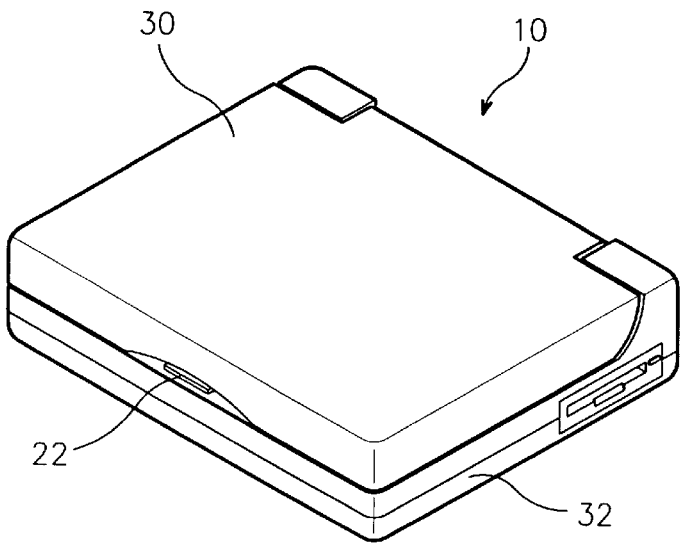
FIG. 2 is a perspective view showing the portable computer of FIG. 1 with the LCD monitor closed.

Turning now to the drawings, FIG. 1 shows a portable computer having liquid crystal display 200 mounted on support member 30 that is hingedly attached to main body 32 of portable computer 10. The location for various mounting speakers 12, organized in pairs, is shown on top surface 201 of portable computer 10. Due to the space limitations, speakers 12 can only be mounted along upper center 202, upper sides 203, and lower sides 204 of top surface 201 of portable computer 10. Speakers 12 are preferably microspeakers and the intervals between the speakers are limited to, at most, a full width of main body 32 of portable computer 10. Furthermore, the speakers mounted on the main body generally face a direction perpendicular to the plane of base 205 of portable computer 10. The combination of the orientation of the speakers and the intervals between the speakers deteriorates the stereophonic effect that can be experienced by a user. Additionally, portable computer 10 has latch device 20 positioned at the top center portion of LCD support member 30 that couples with main body 32 when the portable computer is in a closed position, as shown in FIG. 2. Latch device 20 includes button 22 and hook 24. Groove 26 is positioned along center portion 206 top surface 201 of main body 32 to engage hook 24 of latch 20 when LCD support member 30 is closed.

Figure 3:
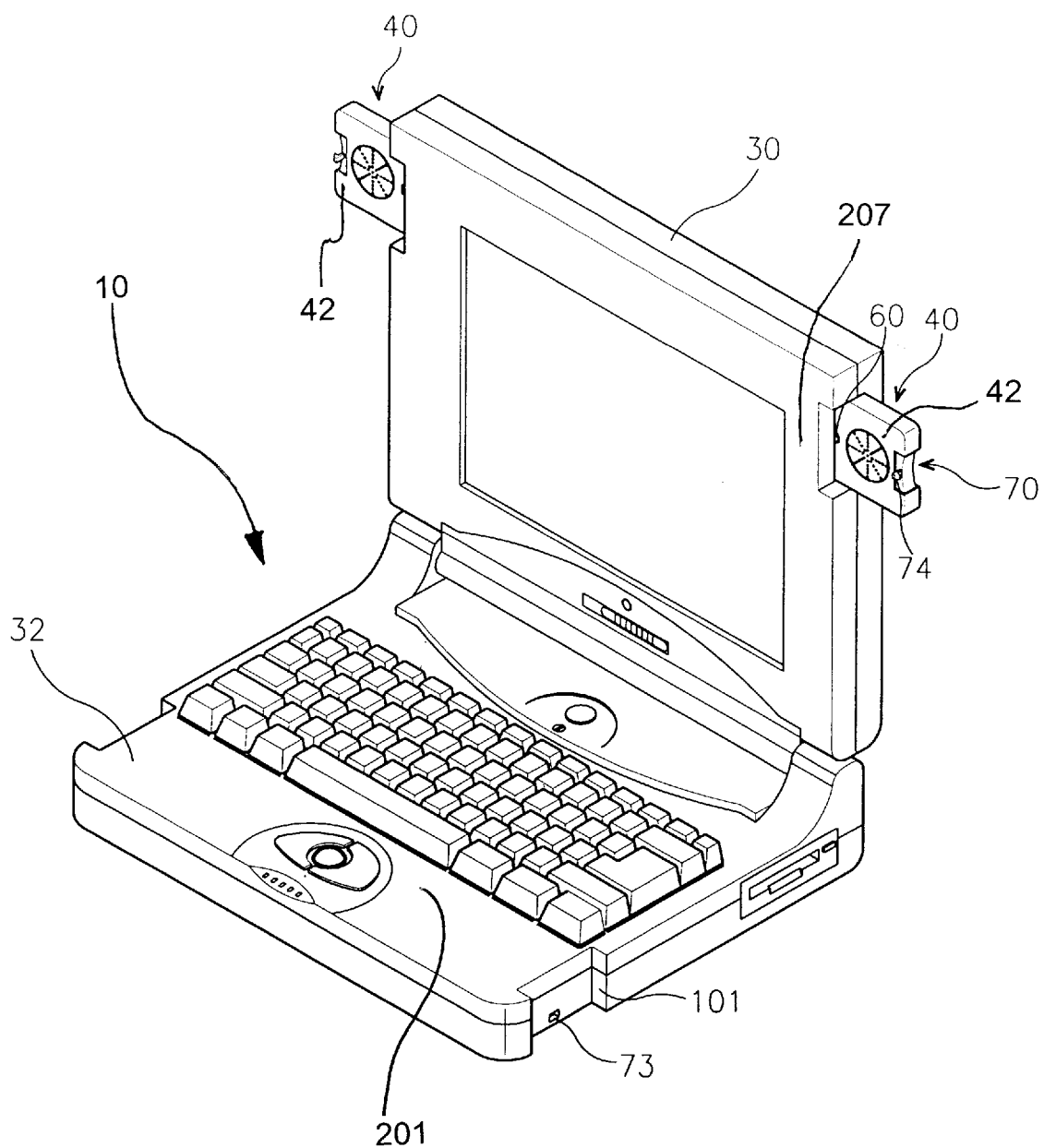
FIG. 3 is a perspective view of a portable computer with a device for mounting speakers to a portable computer as constructed according to the principles of the present invention.
Figure 4:
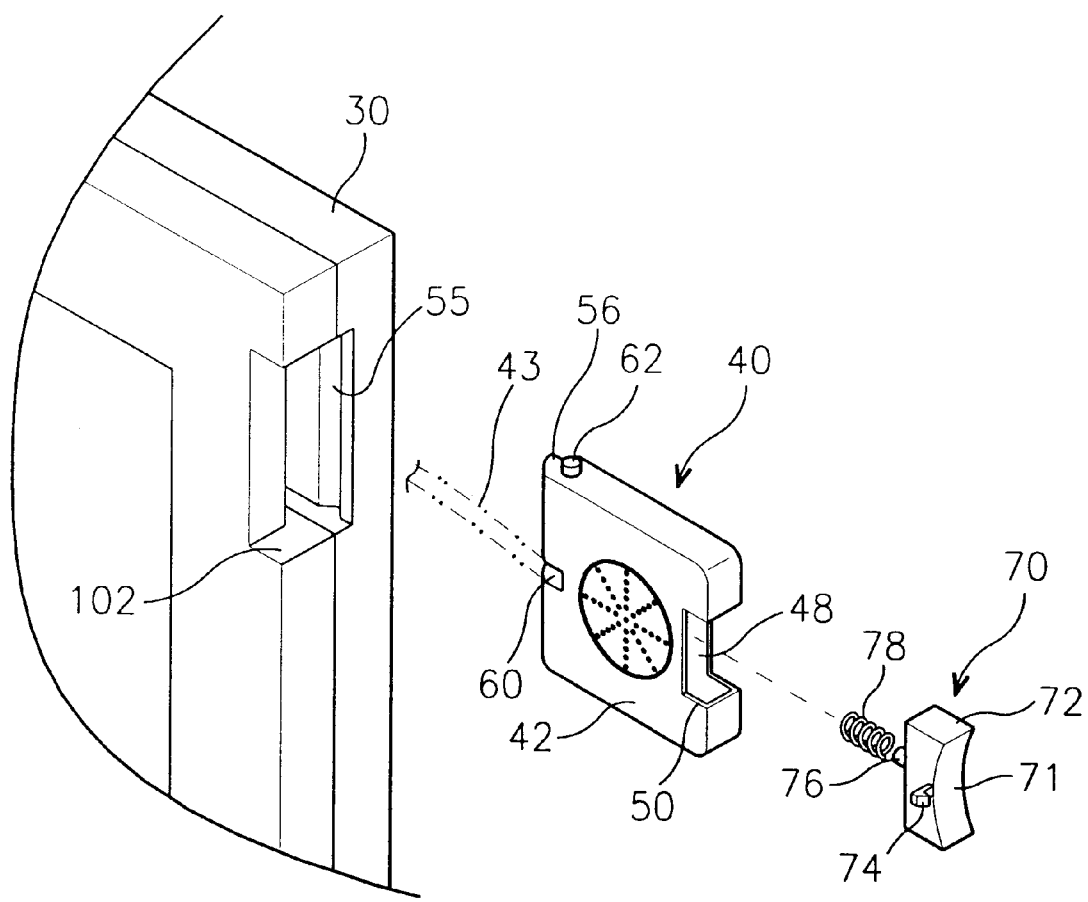
FIG. 4 is an exploded perspective view of a portion of the speaker mounting device of FIG. 3.

FIGS. 3 and 4 illustrate a speaker mounting device as constructed according to a first embodiment of the present invention. The speaker mounting device secures speakers to both sides of LCD support member 30 of portable computer 10 in an extendable manner. Speaker mounting device 40 includes speaker housing 42 hingedly secured to top side portion 201 of LCD support member 30. Speaker housing 42 may be constructed using a microspeaker. Speaker housing 42 has projections 56, at the top and bottom portions of pivot 62. Projections 56 are positioned along the opposite side of grooved compartment 48. Hole 60 is positioned along one side at a center portion of speaker housing 42 to allow electric cord 43 to enter the speaker housing. Electric cord 43 connects the speaker mounted in speaker housing 42 with the audio output terminal (not shown) of the sound generation circuitry of portable computer 10. Speaker mounting device 40 further includes latch 70 that is positioned in compartment 48 of speaker housing 42. Latch 70 may be constructed with button 71, hook 74, shaft 76, and spring 78. The speaker housing 42 can have a substantially rectangular prism shape.

Top side portion 207 of LCD support member 30 has notch 102 formed facing the front of the main body of the portable computer and is designed to pivotally receive speaker housing 42. The notch 102 shown in FIG. 4 can also be described as a slot 102. Speaker housing 42 pivots around groove 55 between a recessable position and an extended position. Furthermore, main body 32 of portable computer 10 has a channel shaped groove 101 formed along the sides of main body 32 that allow speaker housing 42 to be moved flush with the portable computer. Along a lower center portion of groove 101 is side hole 73 that engages hook 74 of latch 70 when the LCD supporting member is in a closed position and the speaker housings are pivoted into a position flush with the portable computer.

Figure 5:
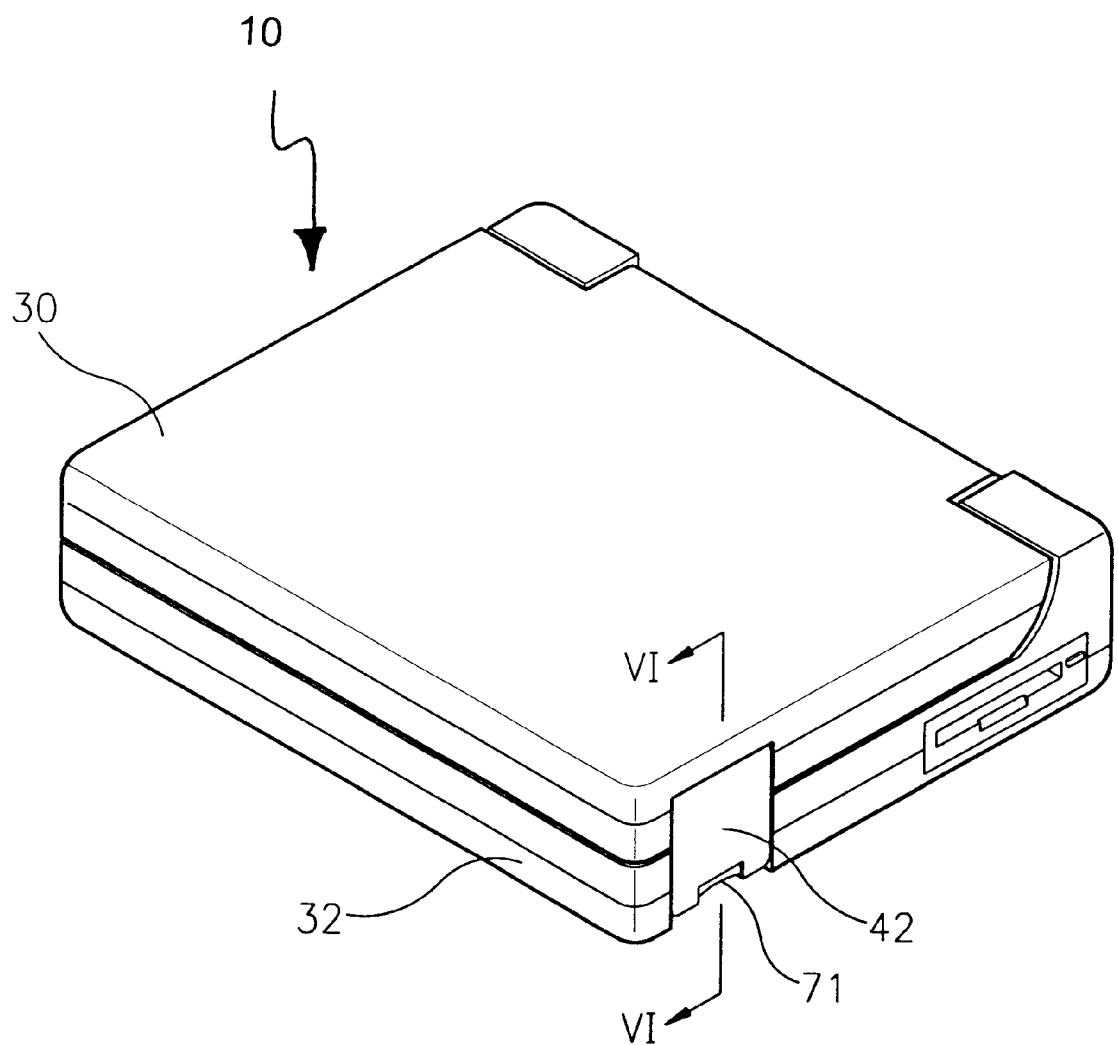
FIG. 5 is a perspective view of the portable computer of FIG. 3 with the speaker housings and mounting device in a closed and latched position while the portable computer is closed.

FIG. 5 illustrates speaker housing 42 and the portable computer when in a closed and locked state. In this condition the portable computer and extendable speakers are easy to store and ship without damaging the components. Speaker housing 42 may be manually moved from an extended position, as shown in FIG. 3, to a recessed position, as shown in FIG. 5. In the recessed position, speaker housing 42 fits flush inside of groove 101 in the sides of main body 32 of portable computer 10. When the speakers are in the recessed position, hook 74 of latch 70 is engaged with hole 73 formed in groove 101 of main body 32. LCD support member 30 maintains a secure coupling state with respect to main body 32.

Figure 6:
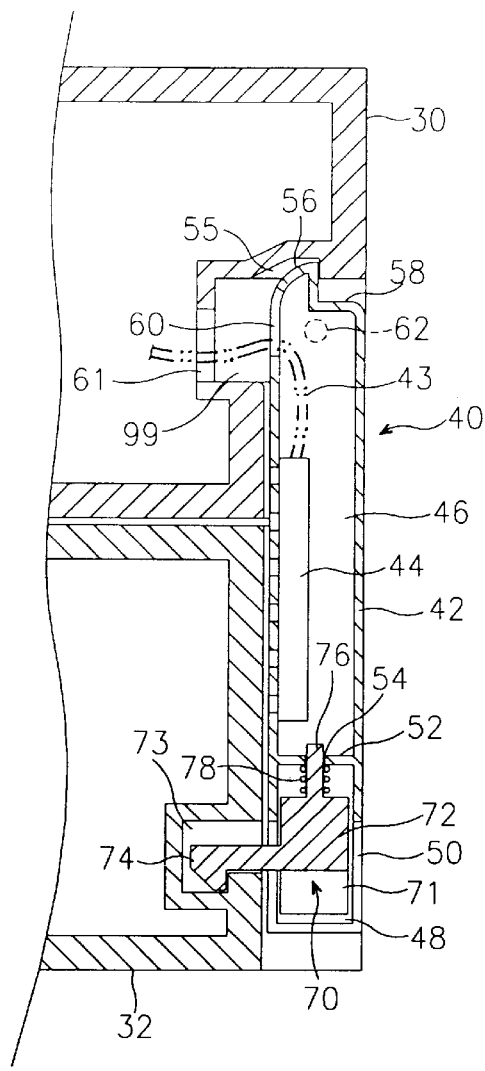
FIG. 6 is a cross-sectional view of the portion of the speaker mounting device of FIG. 5, taken along the direction indicated by the line VI—VI.
Figure 7:
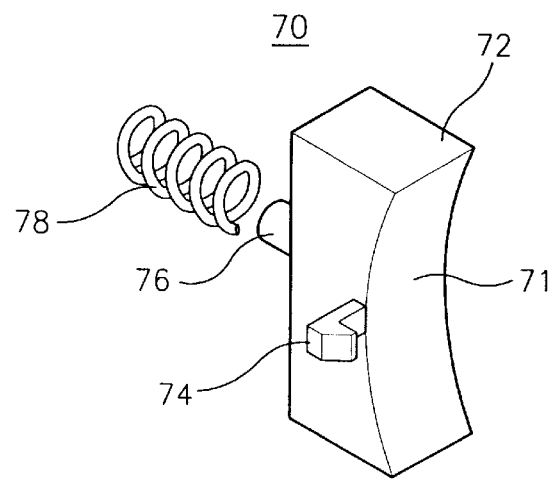
FIG. 7 is an isolated, exploded perspective view of a part of the latch device used in the speaker mounting device of FIG. 3.

The arrangement of speaker mounting device 40 in the recessed, or folded down, position is shown in FIG. 6. Speaker housing 42 has space 46 to mount microspeaker 44 and a plurality of holes on a front surface to allow sound to leave the speaker housing. Groove 55 receives speaker housing 42 and has enough space to allow projection 56 of housing 42 to rotate counterclockwise and then be placed in an unfolded position. When the speaker housing is an unfolded position, the speaker housing is flush with main body 32 of portable computer 10. Furthermore, through a portion of groove 55 is positioned hole 61 that allows electric cord 43 to enter LCD support member 30. Button 71 of latch 70 is elastically supported within compartment 48 of speaker housing 42 in a manner known in the art. The design of latch 70 is one that is well known in the art and is shown in FIG. 7.

Figure 8:
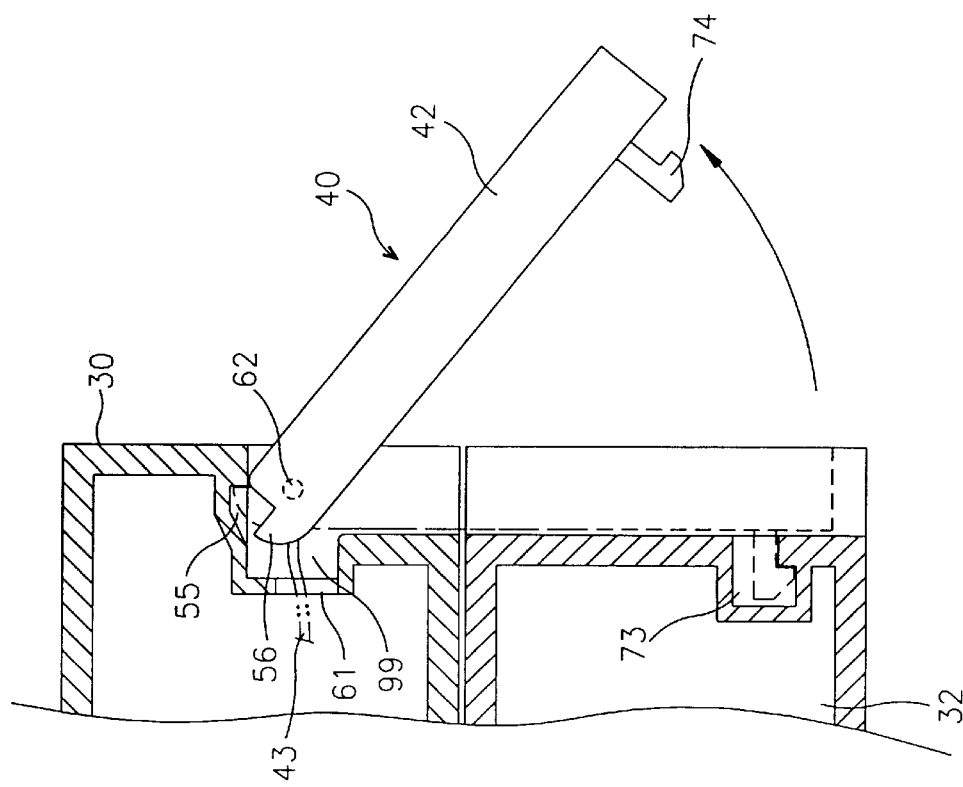
FIG. 8 is a partial cross-sectional view, similar to FIG. 6, illustrating the LCD screen in a closed position and the speaker mounting device in a folded position.
Figure 9:
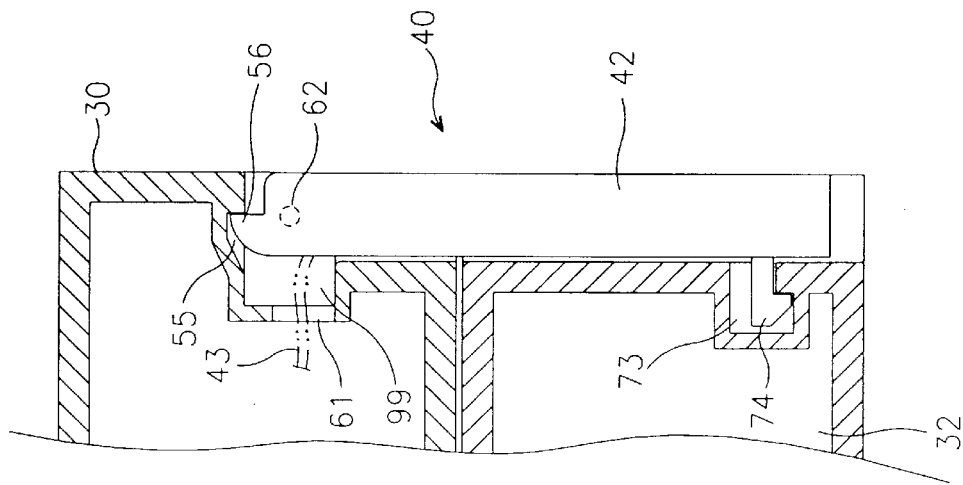
FIG. 9 is a cross-sectional view similar to FIG. 8 that illustrates the speaker mounting device in an un-recessed position.

FIG. 8 illustrates LCD support member 30 in a position with the speaker housing and latch securing the LCD support member in the closed position. By pressing and lifting button 71 of latch 70, the locking mechanism of LCD support member 30 is released and rotation of the speaker housing 42 into an extended position is possible. FIG. 9 shows speaker housing 42 in an position where the speaker housing is not locking the LCD support member in a closed position. When hook 74 of speaker housing 42 is not engaged with side hole 73, speaker housing 42 can be extended outwardly from the side of LCD support member 30. Once the LCD support member 30 of the portable computer is opened to its proper view position, the interval between the speakers can be increased, beyond that available with speakers mounted on a top surface of the main body of portable computer 10, to the extent of the speaker housings 42 width. This allows a widening of the stereophonic sound effect produced by the speakers. Furthermore, latch 70 located in each of speaker housing 42 eliminates the need to provide a separate latch device to secure the portable computer in a closed position. This simplifies the manufacturing process while enhancing the stereophonic effect of the speakers.

Figure 10:
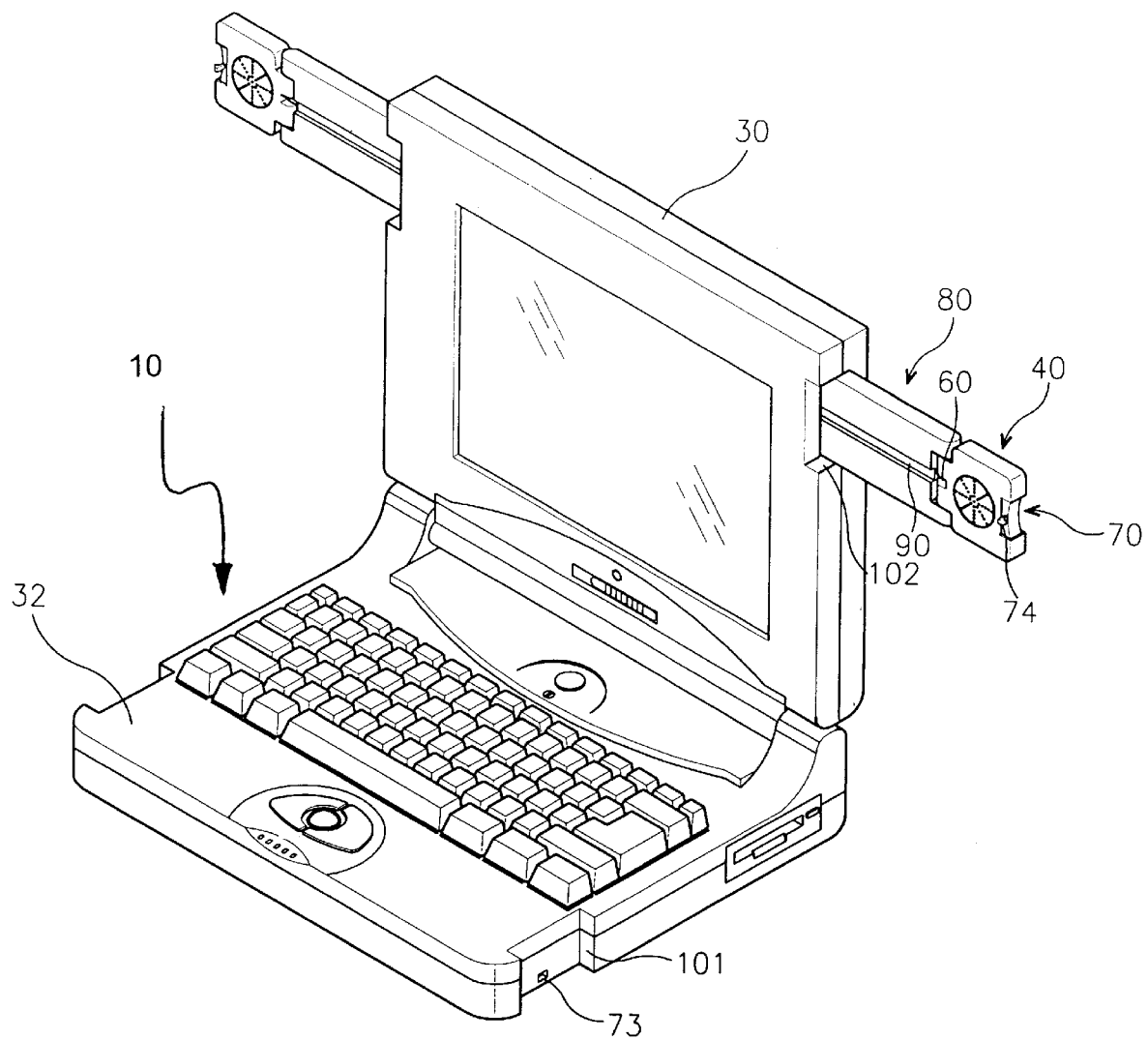
FIG. 10 is a perspective view of a portable computer with a device for mounting speakers as constructed in accordance with a second embodiment of the present invention.
Figure 11:
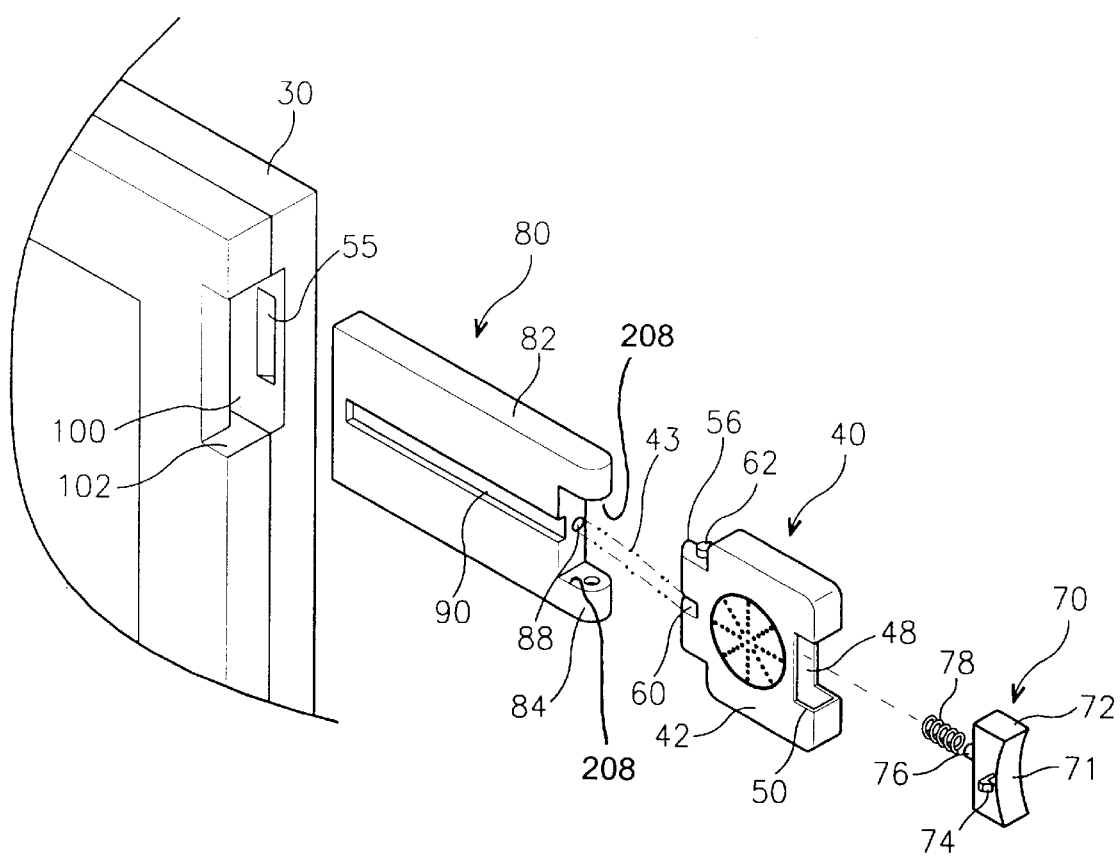
FIG. 11 is an exploded perspective view of a salient feature of the speaker mounting device of FIG. 10.

FIG. 10 illustrates a second embodiment of the speaker mounting device as constructed in accordance with a second embodiment of the present invention. This speaker mounting device provides a means for horizontally extending a speaker housing, that is constructed in the same manner as the speaker housing of the first embodiment, from both sides of LCD support member 30 of portable computer 10. As also shown in FIG. 11, speaker mounting device 40 may be constructed with extension bar 80 that is slidably mounted in both side portions of LCD support member 30 of portable computer 10. Extension bar 80 is made of flat rectangle bar shaped material and has guiding groove 90 lengthwise located along one side. On one end of extension bar 80 is pair of protrusions 84. On opposing inner faces 208 of protrusions 84 are holes 88. The notch 102 shown in FIGS. 10 and 11 can also be described as a slot 102. The detailed construction of extension bar 80 will be described later in regards to FIGS. 14 to 16.

Speaker mounting device 40 has speaker housing 42 hingedly secured between protrusions 84 of extension bar 80. The speaker housing 42 projection 56 on one side of one end and pivots 62 on each side. Speaker housing 42 has compartment 48 on an opposite side from projection 56. Speaker housing 42 has hole 60 formed in a central portion of one side to allow electric cord 43 to enter the speaker housing. Speaker mounting device 40 has latch 70 positioned in compartment 48 of speaker housing 42. Latch 70 may be constructed with button 71, hook 74, and shaft 76, and spring 78.

Along the top side portion of LCD support member 30, notch 102 is formed facing the front side of LCD support member 30. In the middle porting of notch 102 is hollow compartment 100 that receives extension bar 80. Groove 55 is positioned on one wall of notch 102. Extension bar 80 is inserted into compartment 100 and speaker housing 42 pivots around groove 55 between a folded position and an extended position. Furthermore, main body 32 of portable computer 10 has groove 101 along both sides. Groove 101 accommodates speaker housing 42 flush in main body 32. Lower center portion of groove 101 has side hole 73 to engage hook 74 of latch 70 when the LCD supporting member is in a closed position. Furthermore, electric cord 43 connects the speaker mounted in speaker housing 42 with the audio output terminal (not shown) of the sound generation circuitry via holes 60 and 88 of speaker housing 42, extension bar 80, hollow compartment 100, and LCD support member 30. The extension bars 80 can be replaced with telescoping beams.

Figure 12:
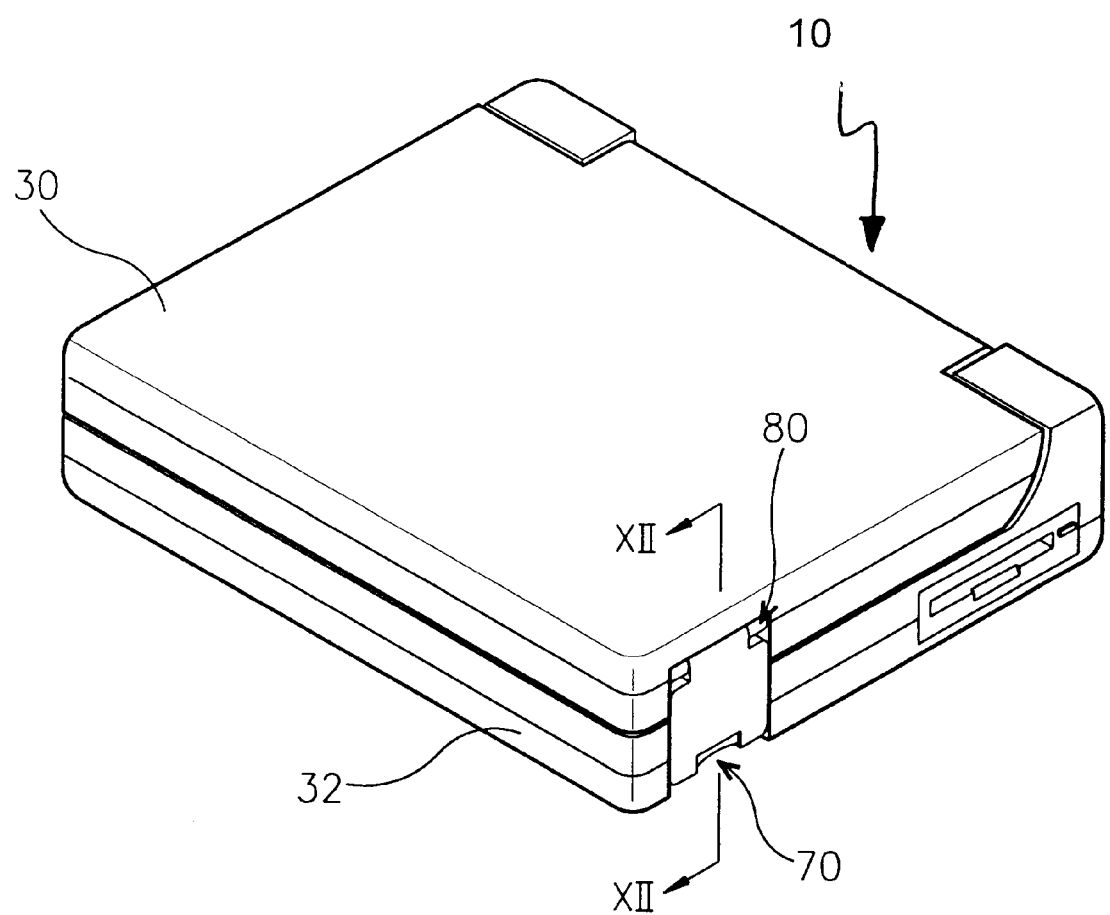
FIG. 12 is a perspective view of the portable computer of FIG. 9 with the LCD screen in a closed position and the speaker mounting device and speaker housings in a retracted and flush orientation.

FIG. 12 illustrates the recessed, or folded down, position of speaker mounting device 40 with LCD support member 30 in the closed position. Speaker housing 42 is manually moved from the unfolded position, as shown in FIG. 10, to the extended position and then extension bar 80 can be slidably moved into compartment 100 of LCD support member 30. In the recessed and folded down position, speaker housing 42 fits flush into groove 101 of main body 32. When LCD supporting member 30 is in the closed position, hook 74 of latch 70 is engaged with hole 73 that is located in groove 101 of main body 32. Thus, LCD support member 30 stays securely coupled with main body 32.

Figure 13:
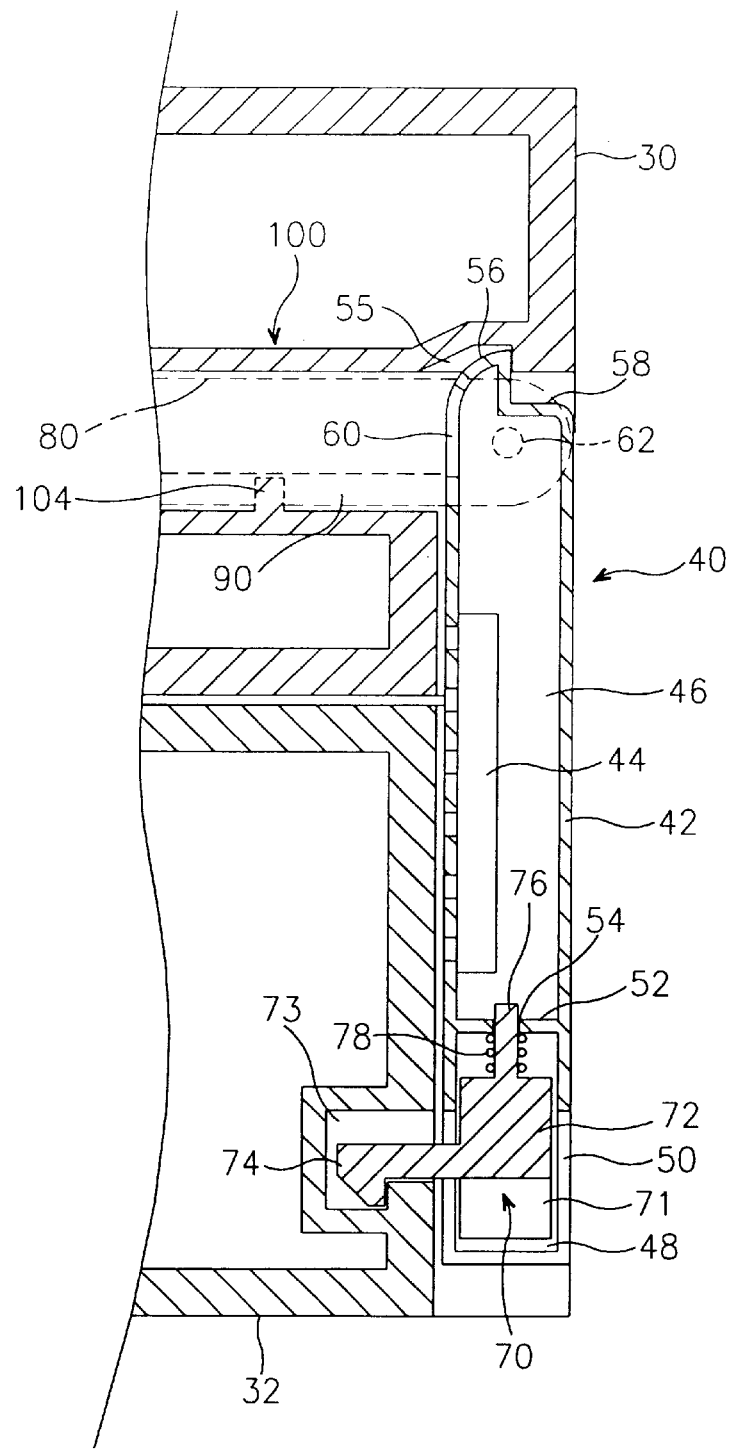
FIG. 13 is a cross-sectional view of a salient feature of the speaker mounting device of FIG. 11, taken along the direction indicated by the line XII—XII.

The arrangement of the speaker mounting device 40 in the recessed and folded down position is shown in FIG. 13. Speaker housing 42 has space 46 to mount microspeaker 44 and a plurality of holes in the front surface for sound to be emitted through. Groove 55 receives projection 56 of speaker housing 42 and has space enough to allow projection 56 of housing 42 to rotate counterclockwise to place the speaker housing in the unfolded position.

Figure 14:
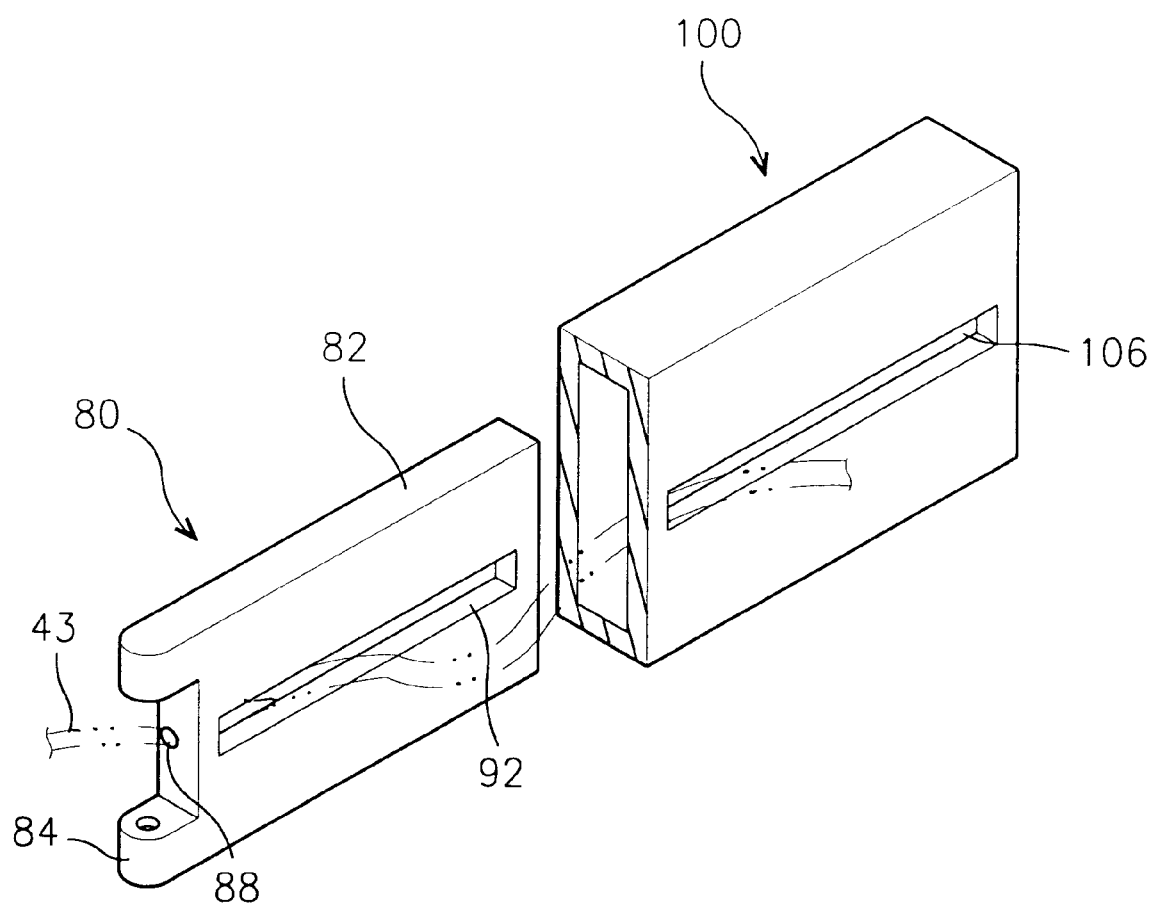
FIG. 14 is an isolated, exploded perspective view of a salient part of an extendable portion of the speaker mounting device of FIG. 13.

Furthermore, in a portion of groove 55 is hollow compartment 100 that extends inside LCD support member 30. This allows extension bar 80 to slidably extend from or retract into LCD support member 30. Elongated hole 106 is shown in FIG. 14, along one side wall of compartment 100, and guide projection 104 is shown in FIG. 13 along another side wall of compartment 100. Thus, guide projection 104, is positioned in compartment 100 to guide and limit the movement of extension bar 80. Elongated hole 106 of compartment 100 passes electric cord 43 through hole 90 of extension bar 80.

Figure 15:
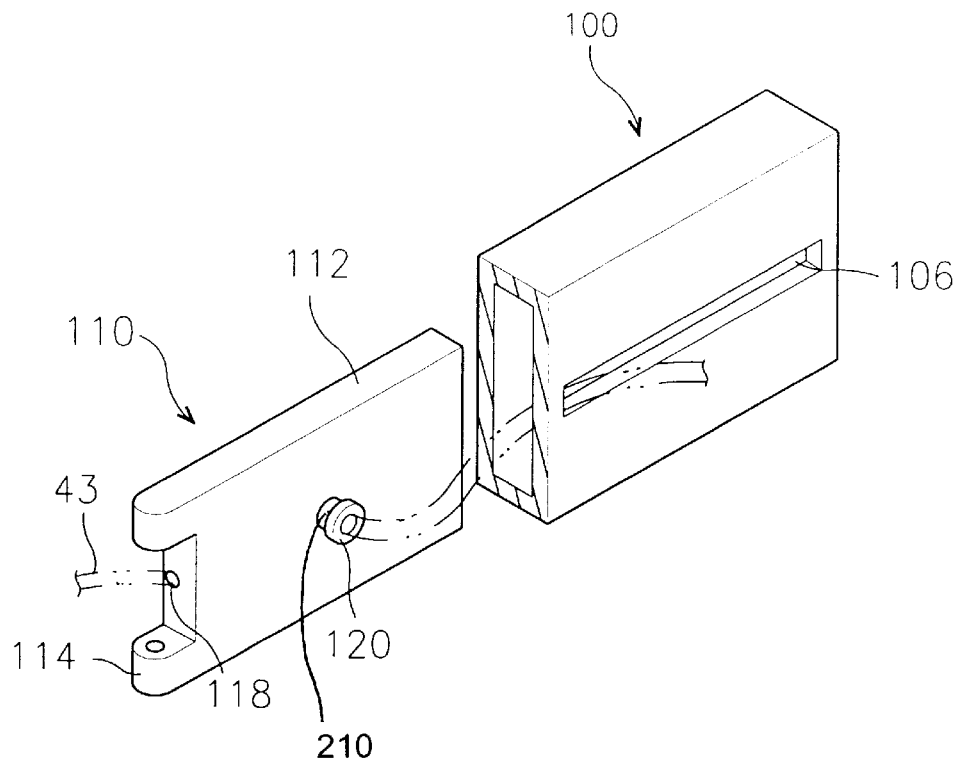
FIG. 15 is a view similar to FIG. 14, that shows a salient portion of an extendable portion of the speaker mounting device of FIG. 13.
Figure 16:
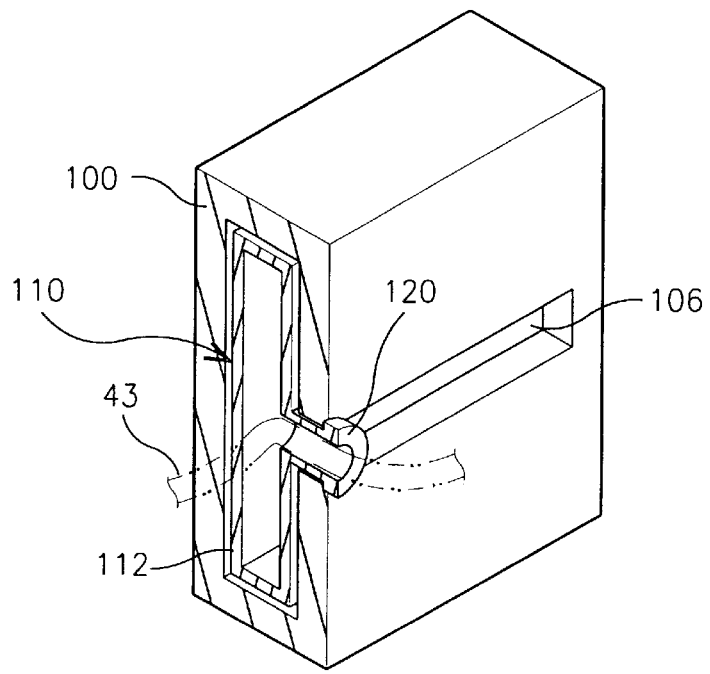
FIG. 16 is a perspective cross-sectional view of the salient portion of FIG. 15.

Another embodiment of the extension bar is shown in FIG. 15. Extension bar 110 is similar to that shown in FIG. 13, except for cylindrical guide projection 120 positioned along a center portion of the extension bar. Guide projection 120 has a circular extension on an outer end forming circular groove 210. Circular groove 210 of projection 120 is engaged with elongated hole 106. Hollow compartment 100 is formed such that elongated hole 106 is formed along one side wall of compartment 100. Thus, as shown in FIG. 16, the periphery of guide projection 120 is fit into the center portion of extension bar 110 through elongated hole 106 that is formed in hollow compartment 100 of LCD support member 30. Electric cord 43 is led from hole 118 to the hole of guide projection 120 of extension bar 110. Guide projection 120 guides the lateral movement of extension bar 110 along elongated hole 106 and limits the distance of the movement. The hole 118 is located between a pair of protrusions 114 of the extension bar 110.

Figure 17:
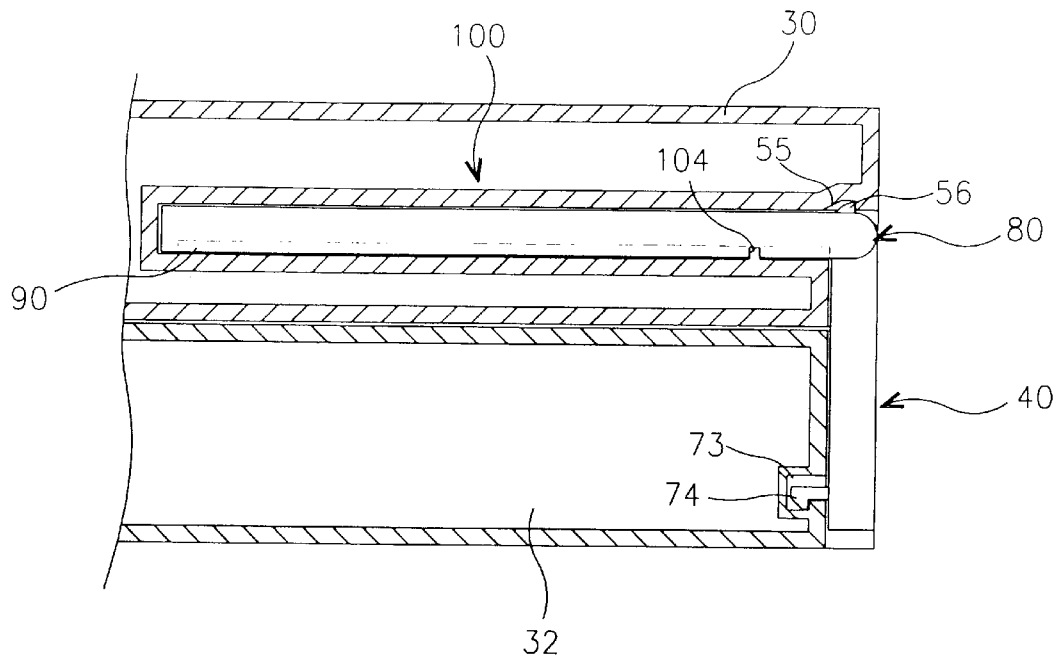
FIG. 17 is a cross-sectional showing the portable computer with the LCD screen in a locked position.
Figure 18:
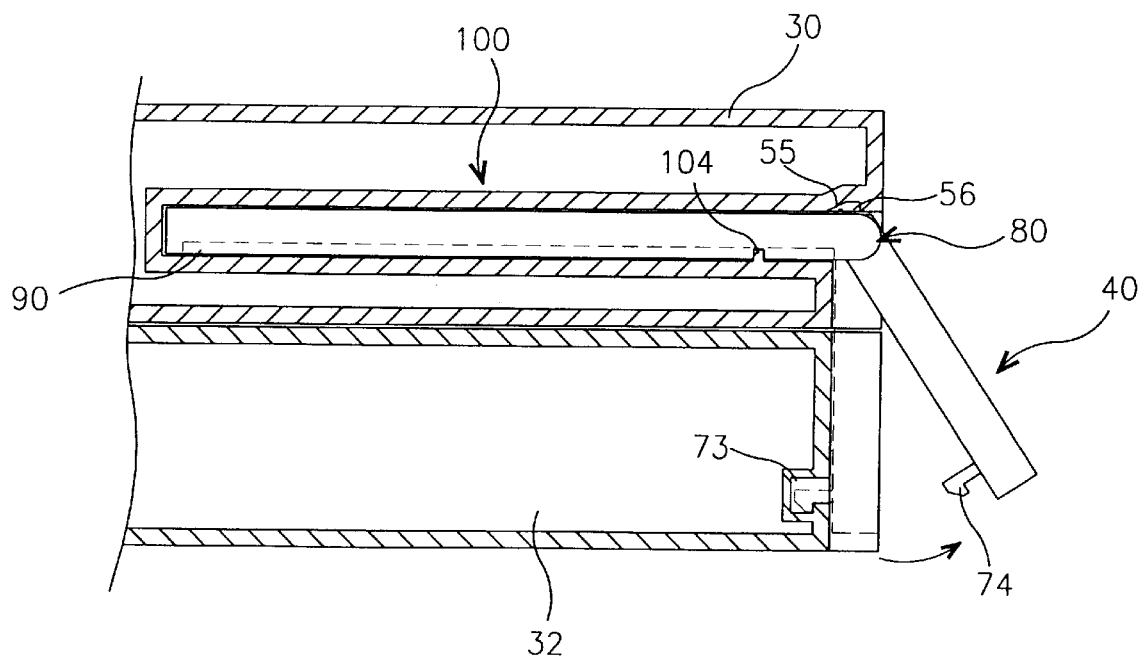
FIG. 18 is a cross-sectional view of the portable computer of FIG. 16 that shows the speaker housing and speaker mounting device in an unlocked position to allow the LCD screen to be moved into an open position.

FIG. 17 shows a locking state of LCD support member 30 of the portable computer when LCD support member 30 is in a closed position and speaker mounting device 40 is retracted and in a folded down position. By pressing and lifting button 71 of latch 70, the locking mechanism of LCD support member 30 is released and then rotation of speaker housing 42 can begin. FIG. 18 shows an unlocked condition of LCD support member 30 where speaker mounting device 40 can be moved to an extended position. Furthermore, by pulling out speaker housing 42 extension bar 80 moves outwardly along elongated hole 90 due to the interaction with projection 104 of compartment 100.

The configuration of the speaker mounting device allows extension bar 80 to be drawn out of both sides of LCD support member 30 of the portable computer. After the extension bar 80 is extended to the desired position, the interval between the speakers can be controlled as extension bar 80 slides in and out of LCD support member 30. This increases the interval that the speakers may be separated from each other. Thus, the interval between the speakers is no longer limited to the width of the main body. Now the interval between the speakers can be increased to be equivalent to the width of the main body, plus extension bar 80, and plus speaker housing 42, in view of the present invention. Thus, the present invention allows for positioning of the speakers outside of the interval priorly possible with attached speakers, and improving the present invention therefore improves the quality of sound supplied by the speakers. Latch 70 is positioned on each one of the speaker housings to eliminate the need for a separate latch device to secure the portable computer in a closed position.

This speaker mounting device provides a way to vary the distance between speakers attached to a portable computer, a way to mount speakers so that both the device and the attached speakers can be retracted flush with the portable computer to allow the portable computer and the associated speakers to be easily shipped and stored, a way to easily rotate a portable computer while avoiding the problem of tangled wires and imprecise symmetrical positioning, a way to eliminate the need for a separate locking mechanism, and a way to enhance the stereophonic qualities of the sound supplied by the speakers.

As apparent from foregoing, the speaker mounting device of the present invention provides for an extendable speaker system for a portable computer. Furthermore, the present invention provides a new structure for mounting speakers to a portable computer that improves the sound quality produced by the speaker while eliminating a separate latching mechanism.

Although these two preferred embodiments of the present invention have been disclosed for illustrative purposes, those skilled in the art will appreciate that various modifications, additions and substitutions are possible, without departing from the scope and spirit of the invention as disclosed in the accompanying claims. For example, it should be understood that the extending members that attach to the speaker housings can have multiple sections to allow for an even greater separation distance between the speakers. It is also possible that other benefits or uses of the currently disclosed invention will become apparent over time.

What is claimed is:

1. A portable computer, comprising:
   a chassis having a main body and a display unit rotatably attached to said main body;
   said main body, comprising:
   a base having a first plurality of sides supporting a keyboard;
   a channel exposed along one of said first plurality of sides; and
   a latch receiving unit positioned in said channel;
   said display unit, comprising:
   a back connected via a second plurality of sides to a variable visual image screen;
   a slot in one of said second plurality of sides;
   a duct with one distal end perforating an inner surface of said slot; and
   an extension bar slidably mounted in both said slot and said duct, said extension bar having a lengthwise exposed groove and having a pair of protrusions formed on a distal end facing outward from said display unit;
   a housing, comprising:
   a front side being connected to a rear side via a third plurality of sides;
   a speaker being contained by said housing; and
   a latch located on said front side;
   said housing for said speaker being rotatable attached to said protrusions on said extension bar and being rotatably contactable with said channel in said main body while said display unit is rotated closed against said main body, said housing being flush with said main body while engaged with said channel in said main body;
   said extension bar being extendable from said display unit to move said housing for said speaker outward from said display unit; and
   said housing for said speaker being alignable with the plane of said variable visual image screen and latchably securing said display unit to said main body while said display unit is rotated closed against said main body, said housing being substantially perpendicular to said display unit when said housing latchably secures said display unit to said main body.

2. The portable computer of claim 1, with said housing further comprising a plurality of pivots being positioned on two opposing sides of said third plurality of sides engaging said slot in said main body.

3. The portable computer of claim 1, with at least one said speaker mounted on each side of said display unit perpendicular to a rotational axis formed between said main body and said display unit.

4. The portable computer of claim 2, with said speaker being a microspeaker.

5. The portable computer of claim 4, with said housing for said speaker having a perforation positioned near said pivots enabling a cable to connect with said speaker.

6. The portable computer of claim 5, with said housing for said speaker including a compartment positioned at a distal end opposite from said pivots, said compartment having a perforation enabling said latch to be deactivated.

7. The portable computer of claim 6, said latch comprising:
   a button being slidably received by the perforation of said compartment of said housing; and
   a spring being coupled to said button to provide force pushing said button outward from interior of said compartment.

8. The portable computer of claim 7, said latch further comprising a hook being mounted to said button and engaging said latch receiving unit.

9. A portable computer, comprising:
   a chassis having a main body and a display unit rotatably attached to said main body;
   said main body, comprising:
   a base having a first plurality of sides supporting a keyboard;

a channel exposed along one of said first plurality of sides; and
a latch receiving unit positioned in said channel;
said display unit, comprising:
a back connected via a second plurality of sides to a variable visual image screen;
a slot in one of said second plurality of sides;
a duct with one distal end perforating an inner surface of said slot; and
an extension bar slidably mounted in both said slot and said duct, said extension bar having a lengthwise exposed groove and having a pair of protrusions formed on a distal end facing outward from said display unit;
a housing, comprising:
a front side being connected to a rear side via a third plurality of sides;
a speaker being contained by said housing; and
a latch located on said front side;
said housing for said speaker being rotatably attached to said protrusions on said extension bar and being rotatably contactable with said channel in said main body while said display unit is rotated closed against said main body, said housing being flush with said main body while engaged with said channel in said main body;
said extension bar being extendable from said display unit to move said housing for said speaker outward from said display unit; and
said housing for said speaker being alignable with the plane of said variable visual image screen and latchably securing said display unit to said main body while said display unit is rotated closed against said main body.

10. The portable computer of claim 9, with said housing further comprising a plurality of pivots being positioned on two opposing sides of said third plurality of sides engaging said slot in said main body.

11. The portable computer of claim 9, with at least one said speaker mounted on each side of said display unit perpendicular to a rotational axis formed between said main body and said display unit.

12. The portable computer of claim 10, with said speaker being a microspeaker.

13. The portable computer of claim 12, with said housing for said speaker having a perforation positioned near said pivots enabling a cable to connect with said speaker.

14. The portable computer of claim 13, with said housing for said speaker including a compartment positioned at a distal end opposite from said pivots, said compartment having a perforation enabling said latch to be deactivated.

15. A portable computer, comprising:
a chassis having a main body and a display unit rotatably attached to said main body, said main body having a channel exposed along a side, said channel having a latch receiving unit and being engagable with a housing for a speaker, said display unit having a slot pivotally receiving said housing, said display unit forming a duct with one distal end perforating an inner surface of said slot; and
an extension bar slidably mounted in both said slot and said duct, said extension bar having a lengthwise exposed groove and having a pair of protrusions formed on a distal end facing outward from said display unit;
said housing being rotatably engagable with said channel, said housing for said speaker being rotatable attached to said protrusions on said extension bar;
said extension bar being extendable from said display unit to move said housing outward from said display unit.

16. The portable computer of claim 15, with said housing further comprising:
a body having a substantially rectangular shape containing said speaker; and
a plurality of pivots being positioned on opposite sides of said housing and being engagable with said slot in said main body.

17. The portable computer of claim 15, with at least one said speaker mounted on each side of said display unit perpendicular to a rotational axis formed between said main body and said display unit.

18. The portable computer of claim 16, with said speaker being a microspeaker.

19. The portable computer of claim 18, with said housing for said speaker having a perforation positioned near said pivots enabling a cable to connect with said speaker.

20. The portable computer of claim 19, with said housing for said speaker including a compartment positioned at a distal end opposite from said pivots, said compartment having a perforation enabling said latching unit to be deactivated.

* * * * *